(12) United States Patent
Sawada

(10) Patent No.: US 10,460,190 B2
(45) Date of Patent: *Oct. 29, 2019

(54) ARTICLE RECOGNITION APPARATUS AND ARTICLE RECOGNITION METHOD

(71) Applicant: TOSHIBA TEC KABUSHIKI KAISHA, Tokyo (JP)

(72) Inventor: Takayuki Sawada, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,932

(22) Filed: Sep. 21, 2018

(65) Prior Publication Data

US 2019/0026583 A1  Jan. 24, 2019

Related U.S. Application Data

(63) Continuation of application No. 15/425,343, filed on Feb. 6, 2017, now Pat. No. 10,095,939.

(51) Int. Cl.
*G06K 9/00* (2006.01)
*G06K 9/20* (2006.01)
*G07G 1/00* (2006.01)
*G01G 19/417* (2006.01)
(Continued)

(52) U.S. Cl.
CPC ......... *G06K 9/2054* (2013.01); *G01G 19/417* (2013.01); *G06K 9/00* (2013.01); *G06K 9/6201* (2013.01); *G06Q 30/0283* (2013.01); *G07G 1/0036* (2013.01); *G07G 1/0063* (2013.01); *G07G 1/0072* (2013.01); *G06K 2209/17* (2013.01)

(58) Field of Classification Search
CPC ... G06F 3/011; G06F 3/0346; G06K 9/00221; G06K 9/00335; G06K 9/00369; G08C 17/00; G08C 17/02; H04N 5/2226
See application file for complete search history.

(56) References Cited

U.S. PATENT DOCUMENTS 6,032,128 A    2/2000  Morrison et al.
7,909,248 B1   3/2011  Goncalves
10,095,939 B2* 10/2018 Sawada ................ G07G 1/0036
(Continued)

FOREIGN PATENT DOCUMENTS

GB    2193000 A    1/1988

*Primary Examiner* — Duy M Dang
(74) *Attorney, Agent, or Firm* — Kim & Stewart LLP

(57) ABSTRACT

According to one embodiment, an article recognition apparatus includes an image interface, a weight interface and a processor. The image interface acquires an image captured by photographing a predetermined place where a plurality of articles are disposed. The processor acquires a first image, acquires a second image after detecting a predetermined event, recognizes an article, based on an image of an article area of an article which is absent in the second image, among article areas extracted from the first image, acquires a registered weight of the recognized article from an article database, and outputs an error if total of the registered weights disagrees with a difference weight between a first weight which a weight scale measures at a time of photographing the first image, and a second weight which the weight scale measures at a time of photographing the second image.

15 Claims, 6 Drawing Sheets

(51) Int. Cl.
    *G06K 9/62*     (2006.01)
    *G06Q 30/02*     (2012.01)

(56) References Cited

U.S. PATENT DOCUMENTS

2009/0152348 A1    6/2009   Ostrowski et al.
2009/0236419 A1    9/2009   Connell, II et al.
2016/0180191 A1    6/2016   Nobuoka et al.

\* cited by examiner

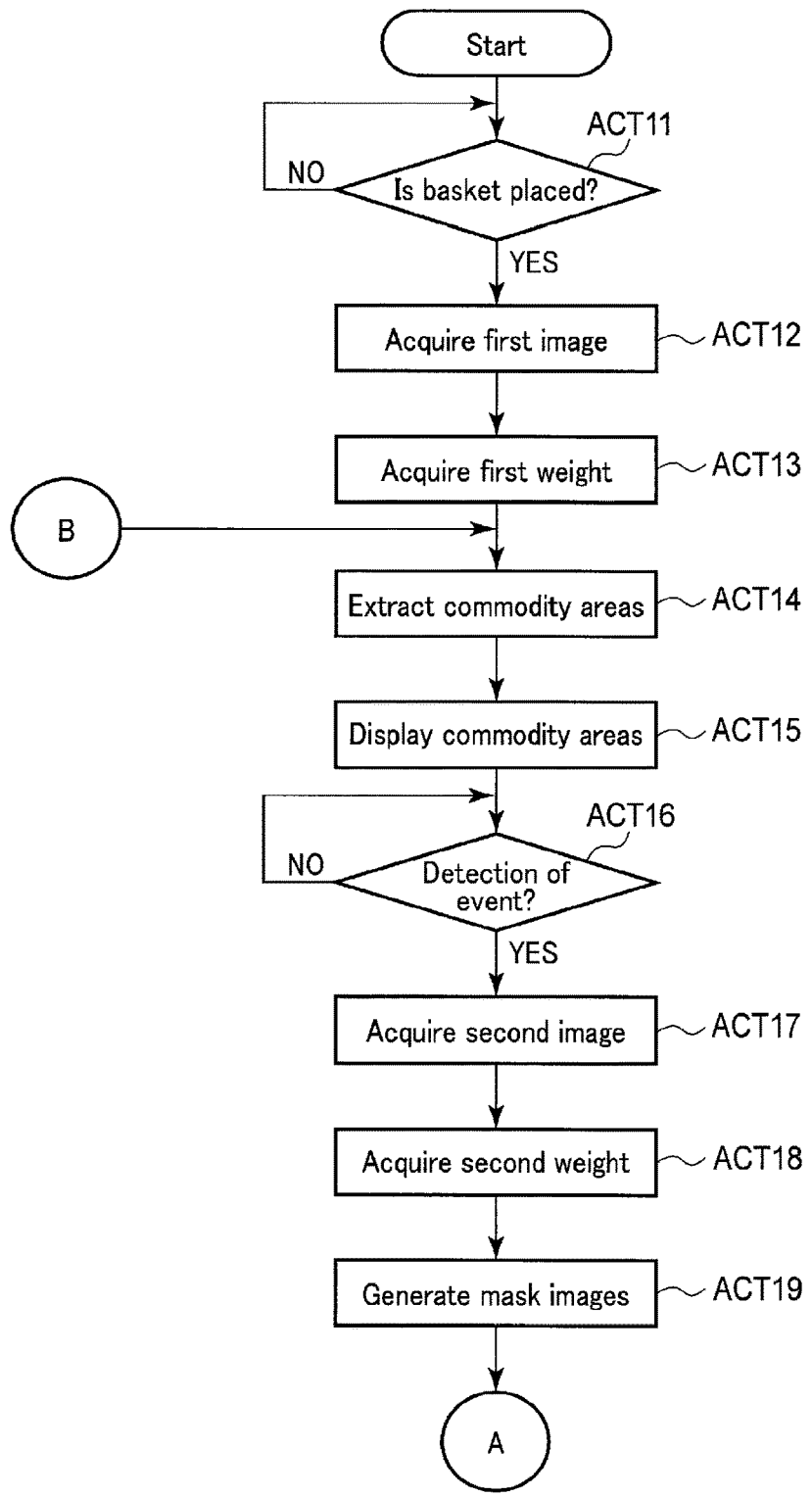
F I G. 8

ARTICLE RECOGNITION APPARATUS AND ARTICLE RECOGNITION METHOD

CROSS-REFERENCE TO RELATED APPLICATION

This application is a continuation of U.S. patent application Ser. No. 15/425,343, filed Feb. 6, 2017, the entire contents of which are incorporated herein by reference.

FIELD

Embodiments described herein relate generally to an article recognition apparatus and an article recognition method.

BACKGROUND

There is known an article processing apparatus which recognizes articles, based on an image captured by photographing articles disposed on a table. The article processing apparatus specifies, from the image, an article area where an article exists, and recognizes the article in the article area, for example, by scanning a bar code or the like, or by object recognition.

In related art, there is a problem that the article processing apparatus cannot recognize articles when a plurality of articles are disposed in an overlapping manner.

OBJECT OF INVENTION

In order to solve the above problem, an article recognition apparatus and an article recognition method are provided, which can recognize articles even when the articles are disposed in an overlapping manner.

BRIEF DESCRIPTION OF THE DRAWINGS

FIG. 8 is a flowchart illustrating an operation example of the settlement apparatus.

DETAILED DESCRIPTION

In general, according to one embodiment, an article recognition apparatus includes an image interface, a weight interface and a processor. The image interface acquires an image captured by photographing a predetermined place where a plurality of articles are disposed. The processor acquires a first image, acquires a second image after detecting a predetermined event, recognizes an article, based on an image of an article area of an article which is absent in the second image, among article areas extracted from the first image, acquires a registered weight of the recognized article from an article database, and outputs an error if total of the registered weights disagrees with a difference weight between a first weight which a weight scale measures at a time of photographing the first image, and a second weight which the weight scale measures at a time of photographing the second image.

An embodiment will be described hereinafter with reference to the accompanying drawings.

To begin with, a settlement according to the embodiment is described.

Figure 1:
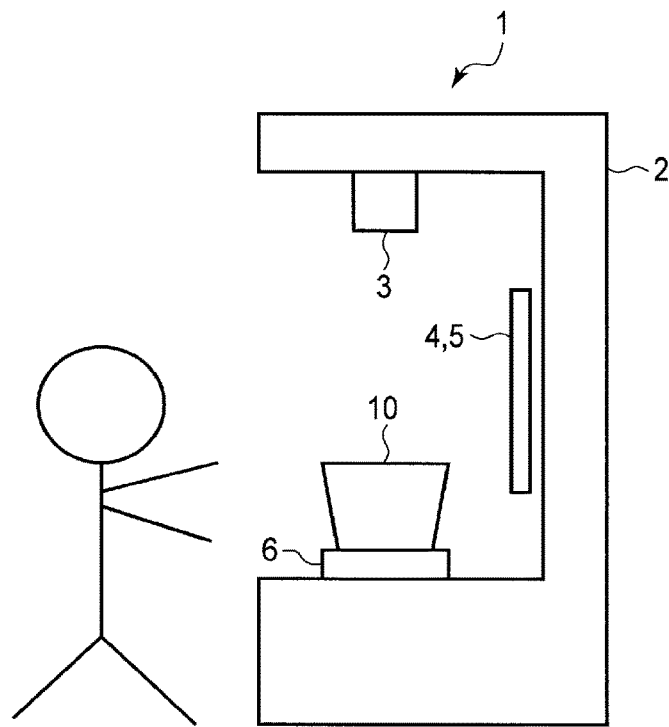
FIG. 1 is a view which schematically illustrates a configuration example of a settlement apparatus according to an embodiment.

FIG. 1 schematically illustrates a configuration example of a settlement apparatus 1 according to the embodiment.

The settlement apparatus 1 (article recognition apparatus) executes a settlement process on commodities (articles) in a basket 10. The settlement apparatus 1 is installed, for example, in a store which sells commodities. For example, when the basket 10 was disposed at a predetermined position or when the settlement apparatus 1 accepted a predetermined operation, the settlement apparatus executes a settlement process on the commodities in the basket 10. The settlement apparatus 1 may be installed as a self-checkout system by which a user performs a settlement process by himself/ herself. In addition, the settlement apparatus 1 may be installed as an ordinary cash register by which a salesclerk of the store performs a settlement process.

As illustrated in FIG. 1, the settlement apparatus 1 includes a housing 2, a camera 3, a display 4, an operation unit 5, and a weight scale 6.

The housing 2 is a frame which forms the outer shape of the settlement apparatus 1. The housing 2 is formed such that the basket 10 can be disposed thereon. In the example illustrated in FIG. 1, the housing 2 has a square bracket (]) shape, and is formed such that the basket 10 can be placed thereon.

The camera 3 photographs commodities in the basket 10. In the example illustrated in FIG. 1, the camera 3 is disposed in a manner to photograph the basket 10 from above. The camera 3 may be disposed in a manner to photograph the inside of the basket 10 obliquely from above. The position and direction for disposition of the camera 3 are not restricted to a specific configuration.

Incidentally, the settlement apparatus 1 may include a plurality of cameras 3. In this case, the plural cameras 3 may be disposed in a manner to photograph commodities in the basket 10 at different positions and angles.

The camera 3 is, for instance, a CCD camera. In addition, the camera 3 may be a camera which is configured to photograph invisible light. The structure of the camera 3 is not restricted to a specific structure.

The display 4 is a display device which displays an image that a processor 21 (to be described later) outputs. The display 4 is, for example, a liquid crystal monitor.

The user of the settlement apparatus 1 inputs various operational instructions to the operation unit 5. The operation unit 5 transmits the data of the operational instructions, which the operator input, to the processor 21. The operation unit 5 is, for instance, a keyboard, numeric keys, and a touch panel. In addition, the operation unit 5 may accept an input of a gesture from the user.

Here, it is assumed that the operation unit 5 is a touch panel and is formed integral with the display 4.

The weight scale 6 measures the weight of commodities. The weight scale 6 is formed on a surface on which the basket 10 is disposed. For example, the weight scale 6 measures the weight of the basket 10 and the commodities in the basket 10. The weight scale 6 transmits the measured weight to the processor 21. In the meantime, the weight scale 6 may transmit to the processor 21 a value calculated by subtracting a preset weight of the basket 10.

Incidentally, the camera 3, display 4, operation unit 5 or weight scale 6 may be formed integral with the housing 2.

In addition, the settlement apparatus 1 may include, for example, an illuminator which illuminates commodities in the basket 10.

Next, a configuration example of the settlement apparatus 1 is described.

Figure 2:
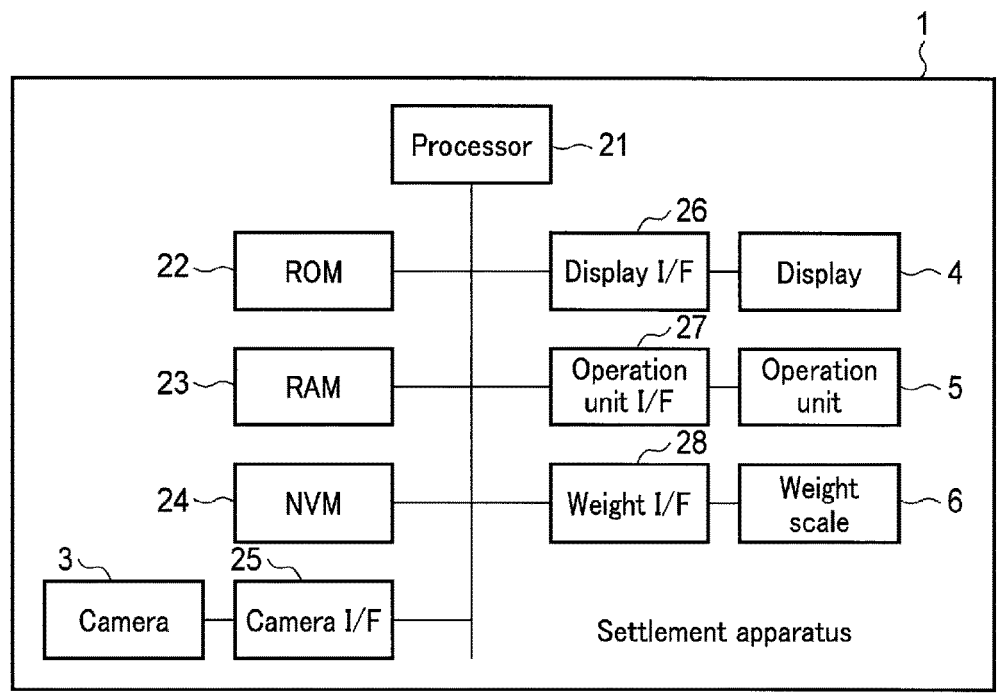
FIG. 2 is a block diagram illustrating a configuration example of the settlement apparatus.

FIG. 2 is a block diagram illustrating a configuration example of the settlement apparatus 1.

As illustrated in FIG. 2, the settlement apparatus 1 includes the camera 3, display 4, operation unit 5, weight scale 6, processor 21, a ROM 22, a RAM 23, an NVM 24, a camera interface 25, a display interface 26, an operation unit interface 27, and a weight interface 28. The processor 21, ROM 22, RAM 23, NVM 24, camera interface 25, display interface 26, operation unit interface 27 and weight interface 28 are interconnected via a data bus or the like.

The camera interface 25 and camera 3 are interconnected via a data bus or the like. The display interface 26 and display 4 are interconnected via a data bus or the like. The operation unit interface 27 and operation unit 5 are interconnected via a data bus or the like. The weight interface 28 and weight scale 6 are interconnected via a data bus or the like.

Incidentally, the settlement apparatus 1 may include some other structure, where necessary, in addition to the structure illustrated in FIG. 2, or may exclude a specific structure.

The camera 3, display 4, operation unit 5 and weight scale 6 are as described above.

The processor 21 includes a function of controlling the operation of the entirety of the settlement apparatus 1. The processor 21 may include an internal cache and various interfaces. The processor 21 realizes various processes by executing programs prestored in an internal memory or NVM 24. The processor 21 is, for example, a CPU.

In the meantime, a part of various functions, which the processor 21 realizes by executing the programs, may be realized by hardware circuitry. In this case, the processor 21 controls the function which is executed by the hardware circuitry.

The ROM 22 is a nonvolatile memory which prestores programs for control, and control data. The ROM 22 is built in the settlement apparatus 1 in the state in which the ROM 22 stores the control programs and control data at a stage of manufacture. Specifically, the control programs and control data, which are stored in the ROM 22, are pre-installed in accordance with the specifications of the settlement apparatus 1.

The RAM 23 is a volatile memory. The RAM 23 temporarily stores, e.g. data which the processor 21 is processing. The RAM 23 stores various application programs, based on instructions from the processor 21. In addition, the RAM 23 may store data necessary for the execution of the application programs, and execution results of the application programs.

The NVM 24 is composed of, for example, a nonvolatile memory which is capable of data write and data rewrite, such as an EEPROM (trademark) or a flash ROM. The NVM 24 stores control programs, applications and various data in accordance with purposes of operational use of the settlement apparatus 1. For example, in the NVM 24, program files and data files are created. Control programs and various data are written in the respective created files.

The NVM 24 prestores a commodity database. The commodity database stores information relating to commodities. The commodity database stores commodity codes and weights of commodities by mutually associating the commodity codes and weights of commodities. The commodity code is information which identifies a commodity. For example, the commodity code is a numeral, a character, a sign, or a combination thereof. The weight of a commodity is the weight of a commodity which the corresponding commodity code indicates.

In the meantime, the commodity database may further includes commodity names and prices. The structure of the commodity database is not limited to a specific structure. For example, the processor 21 acquires the commodity database from an external apparatus, and stores the commodity database in the NVM 24. The NVM 24 may update the commodity database, as needed, in accordance with a signal from the processor 21.

The camera interface 25 is an interface for communication between the processor 21 and camera 3. For example, the processor 21 transmits through the camera interface 25 a signal which causes the camera 3 to capture an image. In addition, the processor 21 may set camera parameters for photography in the camera 3 through the camera interface 25.

In addition, the camera interface 25 (image interface) acquires an image which the camera 3 photographed. The camera interface 25 transmits the acquired image to the processor 21. The processor 21 acquires the image, which the camera 3 photographed, from the camera interface 25.

The display interface 26 is an interface for communication between the processor 21 and display 4. For example, the processor 21 transmits a display screen to the display 4 through the display interface 26.

The operation unit interface 27 is an interface for communication between the processor 21 and operation unit 5. For example, the processor 21 receives through the operation unit interface 27 a signal which indicates an operation that was input to the operation unit 5.

The weight interface 28 is an interface for communication between the processor 21 and weight scale 6. For example, the processor 21 receives a signal, which indicates the weight that the weight scale 6 measured, from the weight scale 6 through the weight interface 28.

Next, the functions which the processor 21 realizes will be described.

To begin with, the processor 21 includes a function of acquiring an image captured by photographing a predetermined place where a plurality of commodities are disposed. Here, the processor 21 acquires an image captured by photographing a plurality of commodities existing in the basket 10.

For example, the processor 21 detects that the basket 10 was disposed in a predetermined area. For example, the processor 21 detects that the basket 10 was disposed on the weight scale 6, based on a signal from the weight scale 6.

Upon detecting that the basket 10 was disposed, the processor 21 executes photography of an image (first image) including a plurality of commodities existing in the basket 10. For example, the processor 21 transmits a signal for photography to the camera 3. The processor 21 acquires the first image from the camera 3. In the meantime, in order to photograph an image, the processor 21 may set photography parameters in the camera 3.

Incidentally, the processor 21 may acquire the first image from an external apparatus.

Figure 3:
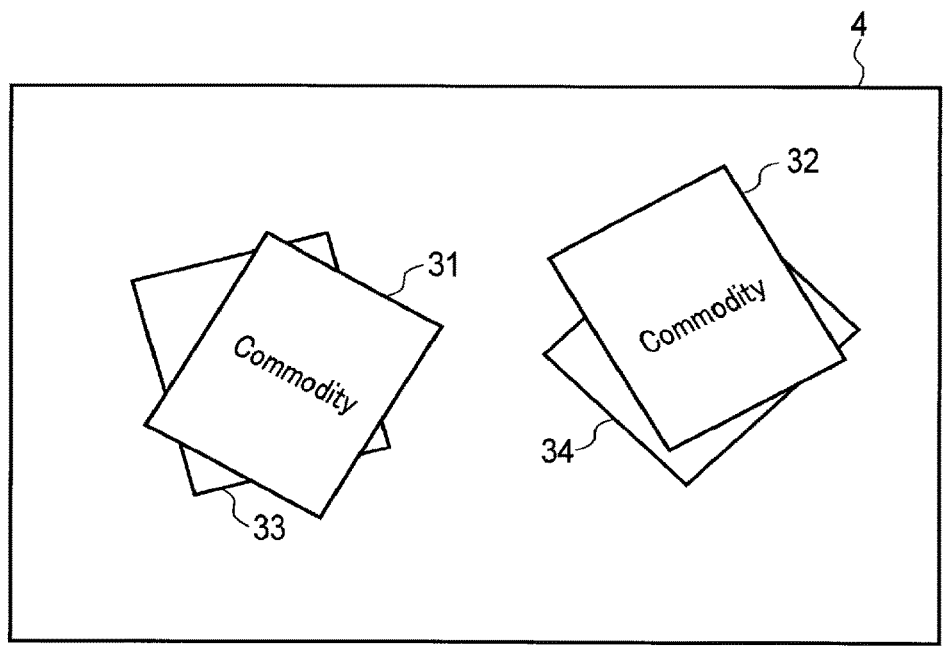
FIG. 3 is a view illustrating an example of a first image.

FIG. 3 illustrates an example of the first image which the camera 3 photographed.

In the example of FIG. 3, the first image includes images of commodities 31 to 34. As illustrated in FIG. 3, the commodity 31 lies on the commodity 33 in an overlapping manner. In addition, the commodity 32 lies on the commodity 34 in an overlapping manner. The commodities 31 and 32 are disposed such that these commodities 31 and 32 can be seen from above. Besides, the commodities 33 and 34 are not exposed upward to such a degree that these commodities 33 and 34 can be recognized.

The processor 21 also includes a function of acquiring the weight of the commodities in the basket 10 by using the weight scale 6. For example, the processor 21 receives a signal indicating the weight from the weight scale 6. The processor 21 acquires the weight (first weight) which the signal indicates. In the example of FIG. 3, the processor 21 acquires the weight of the commodities 31 to 34 (or the weight of the commodities 31 to 34 and the weight of the basket 10).

Furthermore, the processor 21 includes a function of extracting commodity areas (article areas), which are image areas of commodities, from the first image.

For example, the processor 21 extracts commodity areas, based on the first image. For example, the processor 21 extracts the commodity areas from the first image by using edge detection or the like.

In the meantime, the processor 21 may detect the commodity areas from distance information which indicates distances from a predetermined position to respective parts of the first image. For example, the settlement apparatus 1 may include a distance sensor.

The method in which the processor 21 extracts the commodity areas is not limited to a specific method.

The processor 21 also includes a function of presenting the extracted commodity areas to the user. For example, the processor 21 displays the commodity areas on the display 4. For example, the processor 21 displays the first image. The processor 21 displays the first image in combination with information indicating the commodity areas. Here, it is assumed that the processor 21 displays frames indicating the commodity areas.

Figure 4:
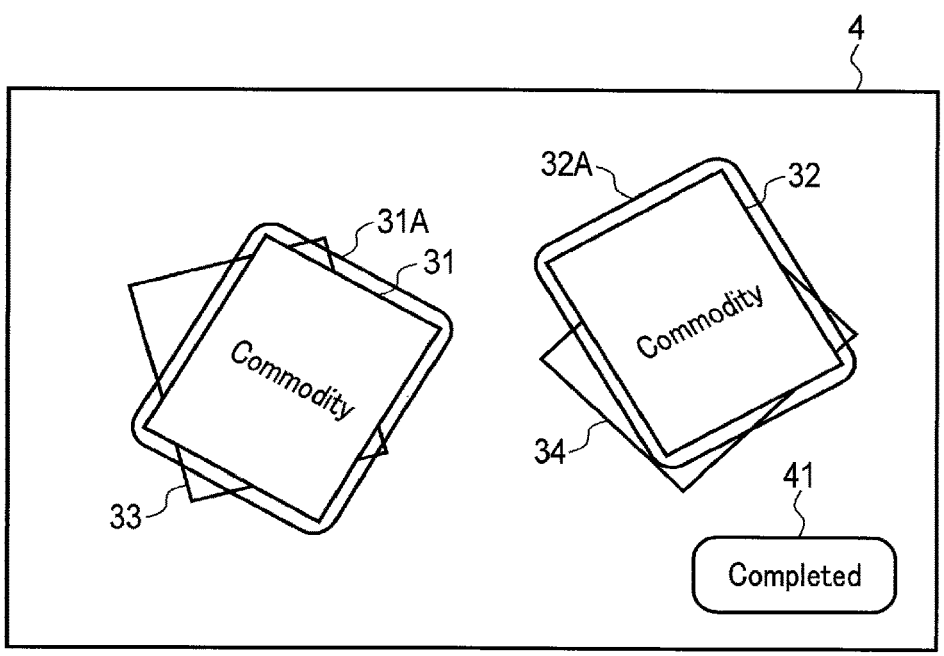
FIG. 4 is a view illustrating a display example of the settlement apparatus.

FIG. 4 illustrates an example of a display screen which the processor 21 displays in order to present the commodity areas. Here, it is assumed that the processor 21 extracted image areas of the commodities 31 and 32 as commodity areas.

As illustrated in FIG. 4, the processor 21 displays a frame 31A and a frame 32A on the first image. The frame 31A indicates the commodity area of the commodity 31. The frame 32A indicates the commodity area of the commodity 32.

Incidentally, in this case, the processor 21 may display a guidance which prompts take-out of the commodities in the extracted commodity areas from the basket 10. In the example of FIG. 4, the processor 21 displays, on the display 4 or the like, a guidance indicating take-out of the commodities in the frame 31A and frame 32A. For example, the processor 21 displays a message such as "Please take out commodities, which are surrounded by the frames, from the basket, and put them in a disposable plastic bag or in your shopping bag".

In addition, the processor 21 includes a function of detecting a predetermined event which indicates completion of take-out of commodities in the commodity areas.

For example, the processor 21 accepts, as the predetermined event, an operation (completion operation) of inputting the completion of take-out of commodities. In the example of FIG. 4, the processor 21 displays an icon 41. The icon 41 is an icon for inputting the completion of take-out of commodities in the commodity areas. For example, the processor 21 accepts a touch on the icon 41 as the completion operation.

Incidentally, the processor 21 may accept, as the predetermined event, a completion operation such as a predetermined gesture.

Additionally, the processor 21 may detect, as the predetermined event, the fact that the weight, which the weight scale 6 measures, does not vary for a fixed time. Besides, the processor 21 may detect the predetermined event, based on an image photographed by the camera 3. The method of detecting the predetermined event is not limited to a specific method.

The processor 21 includes a function of acquiring, upon detecting the predetermined event, an image captured by photographing the predetermined place once again.

The processor 21 executes, upon detecting the predetermined event, photography of an image (second image) including commodities in the basket 10 by using the camera 3.

Incidentally, the processor 21 may acquire the second image from an external apparatus.

Figure 5:
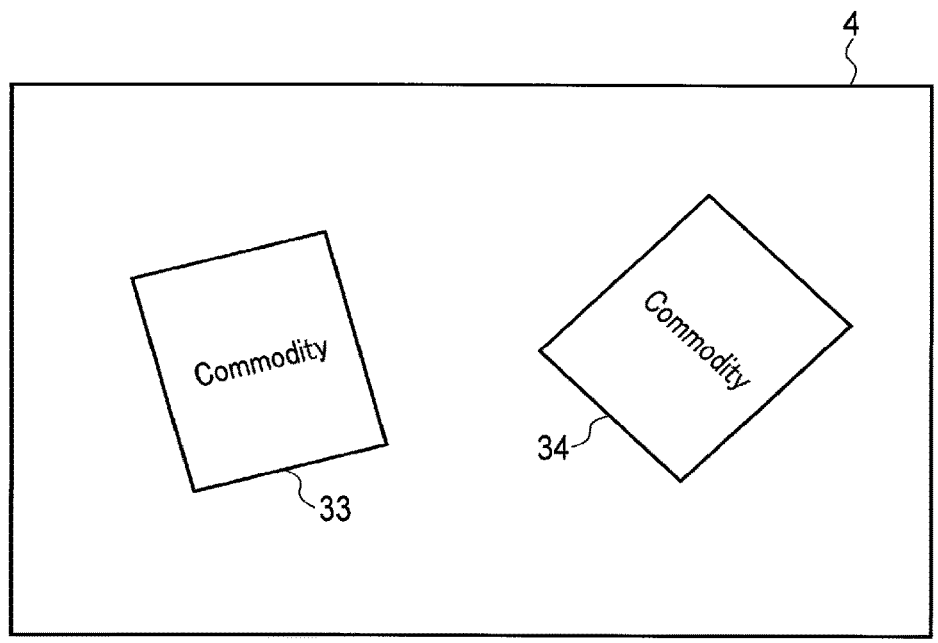
FIG. 5 is a view illustrating an example of a second image.

FIG. 5 illustrates an example of the second image which the camera 3 photographed. Here, it is assumed that the user took out the commodities 31 and 32.

In the example of FIG. 5, the second image includes images of the commodities 33 and 34. Specifically, in the example of FIG. 5, the commodities 31 and 32 were taken out, and the commodities 33 and 34, which existed under the commodities 31 and 32, are exposed.

In addition, the processor 21 includes a function of acquiring, upon detecting the predetermined event, the weight of the commodities in the basket 10 by using the weight scale 6.

The processor 21 acquires the weight (second weight) of the commodities in the basket 10 by using the weight scale 6.

The processor 21 also includes a function of generating, based on the first image and second image, an image (Region of Interest image (ROI image)) of the commodity area, which is the extracted commodity area and is the commodity area of the commodity which the user took out (i.e. the commodity that is absent in the second image).

For example, the processor 21 generates a difference image between the first image and second image. For example, the processor 21 generates the difference image by subtracting a pixel value of the second image from a pixel value of the first image.

Upon generating the difference image, the processor 21 generates, from the difference image, a mask image for extracting the commodity area. For example, the processor 21 generates the mask image by setting the pixel value at 1 if the pixel value of the difference image is not less than a predetermined threshold, and by setting the pixel value at 0 if pixel value of the difference image is less than the predetermined threshold. In the mask image, a pixel value at a position where the difference between the first image and second image is large is 1, and a pixel value at a position where the difference between the first image and second image is small is 0. Specifically, the mask image has a pixel value "1" in the commodity area of the commodity which the user took out, and has a pixel value "0" in other areas.

Upon generating the mask image, the processor 21 generates an ROI image (article area image), based on the first image and the mask image. For example, the processor 21 extracts the ROI image by multiplying the pixel value of the first image and the pixel value of the mask image. The ROI image has a pixel value, which is equal to the pixel value of the first image, at a pixel position where the difference between the first image and second image is not less than the predetermined threshold, and has a pixel value "0" at other pixel positions.

Figure 6:
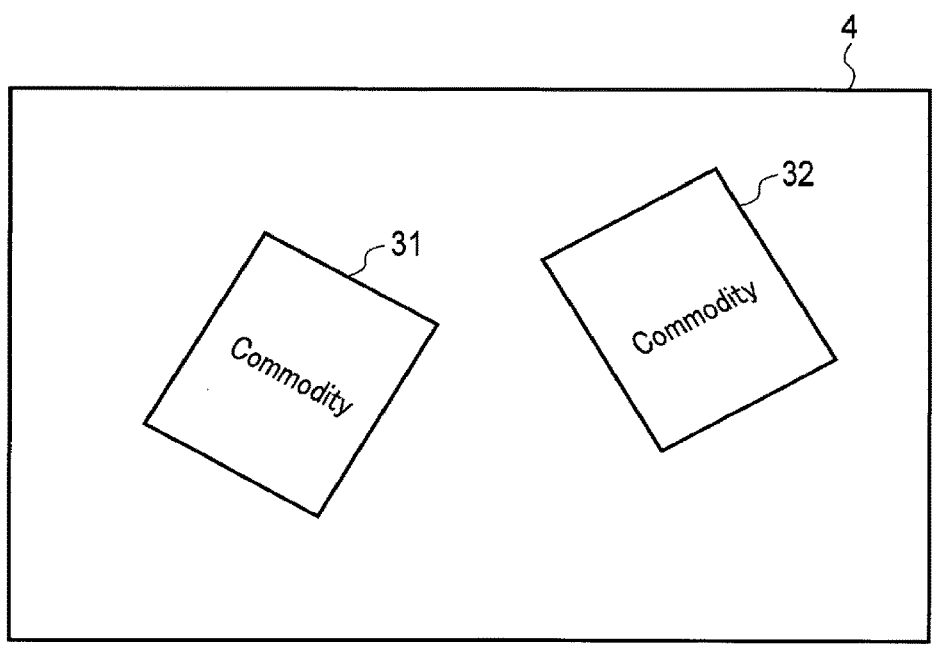
FIG. 6 is a view illustrating an example of a commodity area.

FIG. 6 illustrates an example of the ROI image.

ROI images illustrated in FIG. 6 were extracted based on the first image shown in FIG. 3 and the second image shown in FIG. 5. Accordingly, in the example of FIG. 6, the ROI images are images of the commodities 31 and 32.

In addition, the processor 21 includes a function of recognizing one commodity or a plurality of commodities, based on the ROI image. Here, it is assumed that the processor 21 acquires, as commodity recognition result, a commodity code which indicates a commodity.

For example, the processor 21 reads a bar code in which the commodity code indicating the commodity is encoded. For example, the processor 21 reads the bar code by raster-scanning the ROI image.

Besides, the processor 21 may acquire the commodity code by using object recognition. For example, the processor 21 executes object recognition, based on pre-registered dictionaries or commodity images.

In the meantime, the processor 21 may first read the bar code, and then, if the reading of the bar code failed, may execute object recognition.

The method in which the processor 21 recognizes commodities is not limited to a specific method.

In the example illustrated in FIG. 6, the processor 21 recognizes the commodities 31 and 32.

The processor includes a function of acquiring a pre-registered weight (registered weight) of a recognized commodity.

For example, the processor 21 refers to a commodity database, and acquires, as the registered weight of the commodity, the weight of the commodity corresponding to the commodity code of the recognized commodity.

Incidentally, the processor 21 may acquire the registered weight of the commodity from an external apparatus.

In addition, the processor 21 includes a function of calculating a difference weight between the first weight and second weight. For example, the processor 21 calculates the difference weight by subtracting the second weight from the first weight.

In addition, the processor 21 includes a function of determining whether the total (total weight) of registered weights of commodities agrees with the difference weight.

For example, if the difference between the total weight and the difference weight is not greater than a predetermined threshold, the processor 21 determines that both agree. The predetermined threshold may be preset. Besides, the predetermined threshold may be a value which is calculated by multiplying the total weight by a predetermined ratio.

In addition, the processor 21 includes a function of determining, if the processor 21 determines that the total weight agrees with the difference weight, whether the basket 10 is empty at the time of photographing the second image.

For example, the processor 21 determines whether the basket 10 is empty or not, based on the weight which the weight scale 6 measures. For example, the processor 21 determines that the basket 10 is empty, if the weight of commodities, which the weight scale 6 measures, becomes 0. Besides, the processor 21 may determine whether the basket 10 is empty or not, based on the second image.

Furthermore, if the processor 21 determined that the basket 10 is not empty, the processor 21 recognizes one again commodities in the basket 10. For example, the processor 21 sets the second image and second weight as the first image and first weight, respectively. For example, the processor 21 overwrites the second image and second weight in the memory that stores the first image and in the memory that stores the first weight, respectively.

For example, the processor 21 extracts commodity areas from the first image (which was originally the second image). Upon extracting the commodity areas, the processor 21 displays the extracted commodity areas on the display 4.

Figure 7:
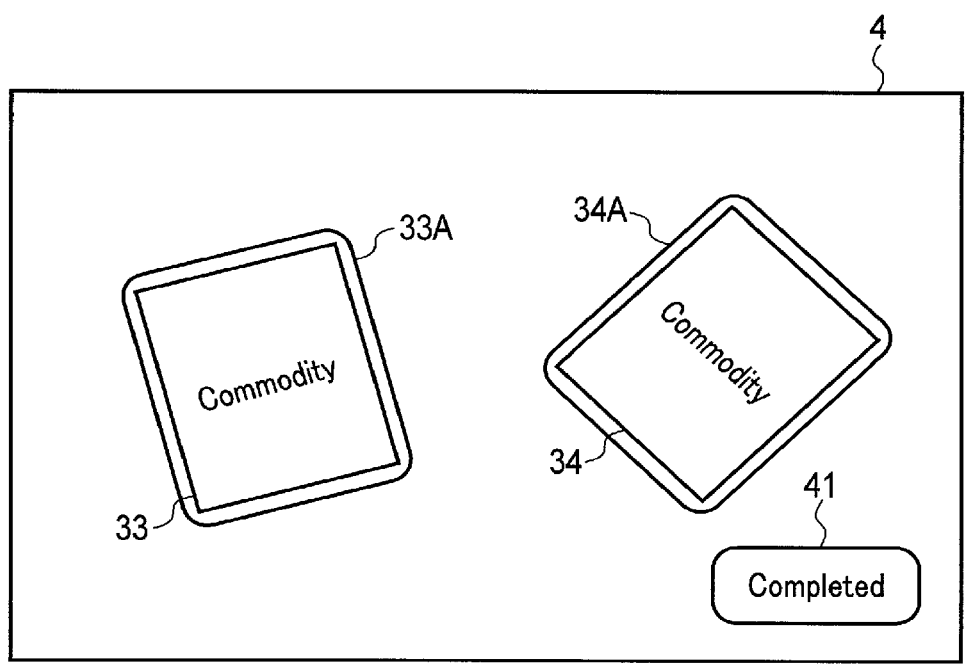
FIG. 7 is a view illustrating a display example of the settlement apparatus.

FIG. 7 illustrates an example of the display screen which the processor 21 displays in order to present commodity areas. Here, it is assumed that the processor 21 extracted the image areas of the commodities 33 and 34 as the commodity areas.

As illustrated in FIG. 7, the processor 21 displays a frame 33A and a frame 34A on the first image. The frame 33A indicates the commodity area of the commodity 33. The frame 34A indicates the commodity area of the commodity 34. Here, it is assumed that the user takes out the commodities 33 and 34 from the basket 10, and touches the icon 41.

Upon accepting the touch on the icon 41, the processor 21 photographs a second image by using the camera 3. Here, it is assumed that the second image includes no commodity image. In addition, the processor 21 acquires a second weight by using the weight scale 6.

The processor 21 generates ROI images, based on the first image and second image. Here, the ROI images are images of the commodities 33 and 34.

The processor 21 recognizes the commodities, based on the ROI images. Upon recognizing the commodities, the processor 21 acquires registered weights of the commodities, and calculates the total weight. Upon calculating the total weight of commodities, the processor 21 calculates a difference weight, based on the first weight and second weight. Upon calculating the difference weight, the processor determines whether the total weight agrees with the difference weight. If the processor 21 determines that the total weight agrees with the difference weight, the processor 21 determines once again whether the basket 10 is empty or not.

In addition, the processor 21 includes a function of settling the recognized commodities if the processor 21 determines that the basket 10 is empty.

For example, the processor 21 refers to the commodity database or the like, and acquires the prices of the recognized commodities. The processor 21 settles the commodities, based on the total (total amount) of the acquired prices. For example, the processor 21 settles the commodities by using the user's credit card information or the like. For example, the processor 21 may accept an input of credit card information through a card reader from the card that the purchaser possesses. Additionally, the processor 21 may acquire an image of the purchaser by using a camera, etc., and may acquire credit information corresponding to the image. Additionally, the processor 21 may settle the commodities by receiving cash from the user. Additionally, the processor 21 may acquire SF (Stored Fare) information from the card, and may settle the commodities, based on the SF information.

In the meantime, the processor 21 may acquire the prices of commodities from an external apparatus. In addition, the processor 21 may transmit the total amount to an external apparatus.

The processor 21 also includes a function of outputting, if the processor 21 determines that the total weight disagrees with the difference weight, an error indicating that the commodity recognition failed. For example, the processor 21 displays a message prompting an alternative action for the user, such as prompting the user to perform the settlement process once again, prompting the user to perform a settlement process at a cash register that is operated by a salesclerk, or prompting the user to call a salesclerk. Incidentally, the processor 21 may transmit the error to an external apparatus.

Next, an operation example of the settlement apparatus 1 will be described.

Figure 9:
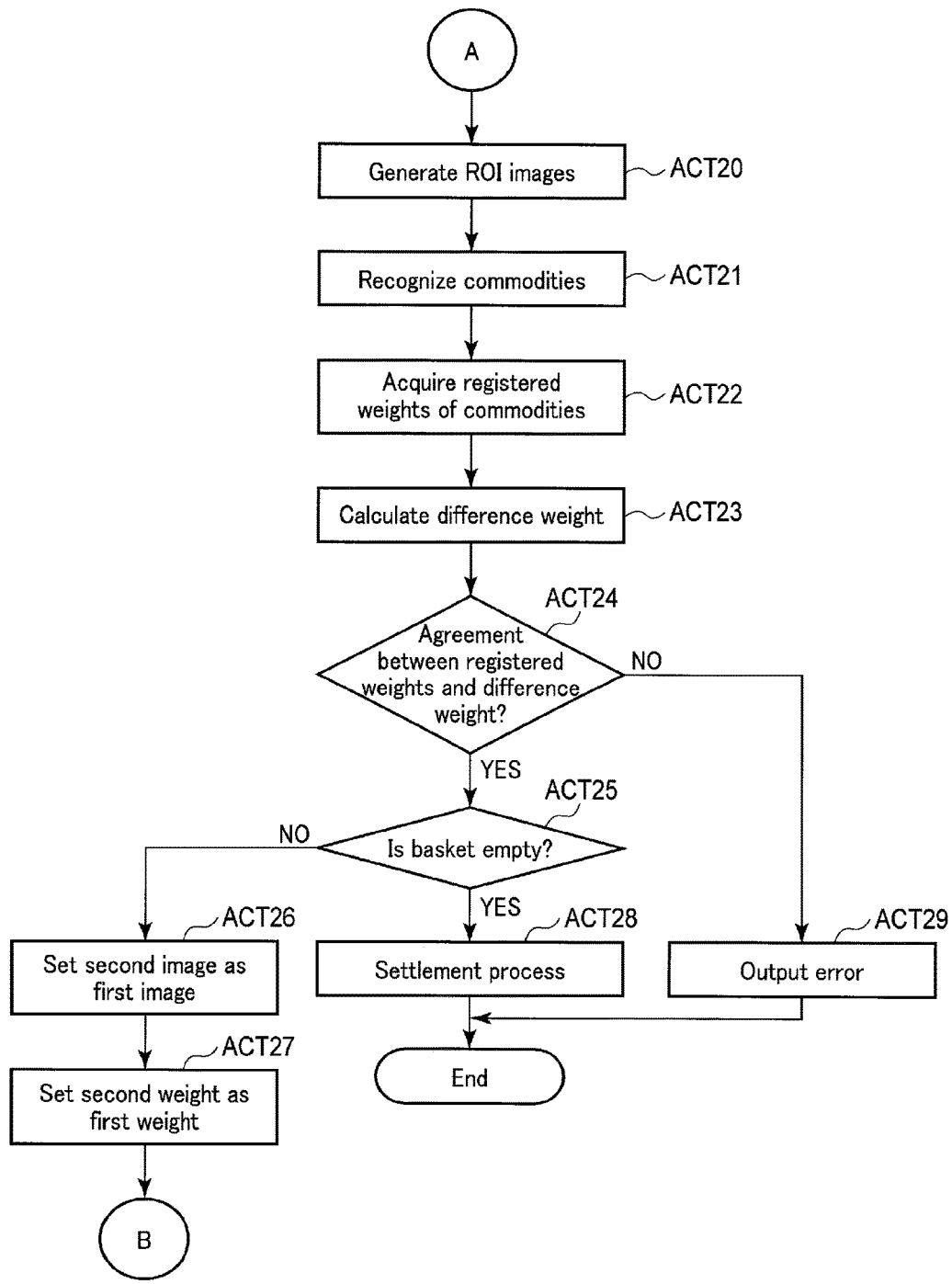
FIG. 9 is a flowchart illustrating an operation example of the settlement apparatus.

FIG. 8 and FIG. 9 are flowcharts for describing the operation example of the settlement apparatus 1.

To start with, the processor 21 of the settlement apparatus 1 determines whether the basket 10 was disposed on the weight scale 6 (ACT 11). If the processor 21 determines that the basket 10 was not disposed on the weight scale 6 (ACT 11, NO), the processor 21 returns to ACT 11.

If the processor 21 determines that the basket 10 was disposed on the weight scale 6 (ACT 11, YES), the processor 21 acquires a first image by using the camera 3 (ACT 12). Upon acquiring the first image, the processor 21 acquires a first weight by using the weight scale 6 (ACT 13).

Upon acquiring the first weight, the processor 21 extracts commodity areas from the first image (ACT 14). Upon extracting the commodity areas, the processor 21 displays the commodity areas on the display 4 (ACT 15). Upon displaying the commodity areas, the processor 21 determines whether the processor 21 detected a predetermined event (ACT 16).

If the processor 21 determines that the processor 21 did not detect the predetermined event (ACT 16, NO), the processor 21 returns to ACT 16.

If the processor 21 determines that the processor 21 detected the predetermined event (ACT 16, YES), the processor 21 acquires a second image by using the camera 3 (ACT 17). Upon acquiring the second image, the processor 21 acquires a second weight by using the weight scale 6 (ACT 18).

Upon acquiring the second weight, the processor 21 generates mask images, based on the first image and the second image (ACT 19). Upon generating the mask images, the processor 21 generates ROI images, based on the first image and the mask images (ACT 20).

Upon generating the ROI images, the processor 21 recognizes commodities, based on the ROI images (ACT 21). Upon recognizing the commodities, the processor 21 acquires registered weights of the recognized commodities (ACT 22). Upon acquiring the registered weights, the processor 21 calculates a difference weight, based on the first weight and the second weight (ACT 23).

Upon calculating the difference weight, the processor 21 determines whether the total of the registered weights agrees with the difference weight (ACT 24). If the processor 21 determines that the total of the registered weights agrees with the difference weight (ACT 24, YES), the processor 21 determines whether the basket 10 is empty or not (ACT 25).

If the processor 21 determines that the basket 10 is not empty (ACT 25, NO), the processor 21 sets the second image as the first image (ACT 26). Upon setting the second image as the first image, the processor 21 sets the second weight as the first weight (ACT 27). Upon setting the second weight as the first weight, the processor 21 returns to ACT 14.

If the processor 21 determines that the basket 10 is empty (ACT 25, YES), the processor 21 settles the recognized commodities (ACT 28).

If the processor 21 determines that the total of the registered weights disagrees with the difference weight (ACT 24, NO), the processor 21 outputs an error (ACT 29).

When the processor 21 settled the recognized commodities (ACT 28) or output the error (ACT 29), the processor 21 terminates the operation.

In the meantime, the processor 21 may not execute the settlement process (ACT 28). The processor 21 may transmit the information (e.g. commodity codes), which indicate the recognized commodities, to the external apparatus.

Additionally, the processor 21 may recognize articles other than commodities. The objects, which the processor 21 recognizes, are not limited to specific structures.

Additionally, the processor 21 may output an error, when a commodity was taken out from an area other than the extracted commodity area.

The settlement apparatus with the above-described structure recognizes upper commodities among the commodities which are disposed in an overlapping manner. In addition, the settlement apparatus prompts the user to take out the upper commodities which are recognizable, thereby causing lower commodities to be exposed. The settlement apparatus recognizes the lower commodities. The settlement apparatus continues the same operation until there remains no commodity. As a result, the settlement apparatus can effectively recognize the commodities which are disposed in an overlapping manner.

Additionally, after the user took out commodities, the settlement apparatus executes a recognition process of the taken-out commodities, based on the ROI images that are the images of the taken-out commodities. Thus, the settlement apparatus can detect the actually taken-out commodities among the upper commodities which are recognizable. As a result, the settlement apparatus can prevent an unlawful act, such as take-out of a non-recognized commodity by the user, compared to a method in which a commodity, after recognized, is taken out.

Additionally, the settlement apparatus continues the recognition process if the pre-registered weight of the commodity agrees with the weight of the taken-out commodity. As a result, the settlement process can prevent an unlawful act, such as take-out of a non-recognized commodity by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A settlement apparatus for commodities, comprising:
  an image interface configured to acquire an image captured by photographing a predetermined place where a plurality of commodities are disposed;
  a weight interface configured to acquire a weight of the commodities measured by a weight scale, the weight scale being configured to measure the weight of the commodities disposed at the predetermined place; and
  a processor configured to:

acquire a first image through the image interface;
acquire a second image through the image interface after detecting a predetermined event;
recognize which one or more commodities out of the plurality of commodities have been taken out based on the first and the second image;
acquire registered weights of the recognized one or more commodities from a commodity database;
output an error if a total of the registered weights disagrees with a difference between a first weight which the weight scale measures at a time of photographing the first image, and a second weight which the weight scale measures at a time of photographing the second image;
acquire a price corresponding to the recognized one or more commodities; and
complete settlement of the commodities based on the acquired price when the weight scale does not detect any commodity.

2. The settlement apparatus of claim 1, further comprising:
a display interface configured to communicate with a display,
wherein the processor is configured to control the display to display commodity areas, which are extracted from the first image, on the display through the display interface.

3. The settlement apparatus of claim 2, wherein the processor is configured to control the display to display the first image on the display through the display interface, and to display, on the first image, frames indicating the commodity areas extracted from the first image.

4. The settlement apparatus of claim 1, further comprising:
an operation interface,
wherein the processor is configured to detect the predetermined event upon receipt of an input of a predetermined operation through the operation interface.

5. The settlement apparatus of claim 1, wherein the processor is configured to accept a predetermined gesture as the predetermined event.

6. The settlement apparatus of claim 1, wherein the processor is configured to
determine, if the total of the registered weights agrees with the difference, whether one or more commodities are present at the predetermined place at the time of photographing the second image,
if the processor determines that one or more commodities are present at the predetermined place at the time of photographing the second image, set the second image as a new first image and set the second weight as a new first weight,
acquire a new second image through the image interface after detecting a predetermined event,
recognize which one or more commodities have been taken out, based on the new first and second images,
acquire, from the commodity database, registered weights of the commodities recognized based on the new first and second images, and
output an error if the total of the registered weights disagrees with a difference weight between the new first weight and a new second weight which the weight scale measures at the time of photographing the new second image.

7. The settlement apparatus of claim 1, further comprising:
a non-volatile memory storing the commodity database.

8. The settlement apparatus of claim 1, wherein the processor is configured to generate a difference image between the first image and the second image, to generate a mask image based on the difference image, and to generate, based on the mask image, an image of commodity areas of the one or more commodities that have been taken out.

9. A settlement method of commodities, comprising:
acquiring a first image captured by photographing a predetermined place where a plurality of commodities are disposed;
acquiring a second image captured by photographing the predetermined place after detecting a predetermined event;
recognizing which one or more commodities out of the plurality of commodities have been taken out based on the first and the second image;
acquiring registered weights of the recognized one or more commodities from a commodity database;
outputting an error if the total of the registered weights disagrees with a difference between a first weight which a weight scale measures at a time of photographing the first image, and a second weight which the weight scale measures at a time of photographing the second image, the weight scale being configured to measure a weight on the predetermined place;
acquiring a price corresponding to the recognized one or more commodities; and
completing settlement of the commodities based on the acquired price when the weight scale does not detect any commodity.

10. The settlement method of claim 9, further comprising:
displaying commodity areas, which are extracted from the first image, on a display.

11. The settlement method of claim 10, further comprising:
displaying the first image on the display; and
displaying, on the first image, frames indicating the commodity areas extracted from the first image.

12. The settlement method of claim 9, wherein
the predetermined event is detected upon receipt of an input of a predetermined operation through an operation interface.

13. The settlement method of claim 9, further comprising:
accepting a predetermined gesture as the predetermined event.

14. The settlement method of claim 9, further comprising:
determining, if the total of the registered weights agrees with the difference, whether one or more commodities are present at the predetermined place at the time of photographing the second image;
if one or more commodities are present at the predetermined place at the time of photographing the second image, setting the second image as a new first image and setting the second weight as a new first weight;
acquiring a new second image through an image interface after detecting a predetermined event,
recognizing which one or more commodities have commodity has been taken out based on the new first and second images;
acquiring, from the commodity database, registered weights of the commodities recognized based on the new first and second images; and
outputting an error if the total of the registered weights disagrees with a difference weight between the new first weight and a new second weight which the weight scale measures at the time of photographing the new second image.

15. The settlement method of claim 9, further comprising:
generating a difference image between the first image and the second image;
generating a mask image based on the difference image; and
generating, based on the mask image, an image of commodity areas of the one or more commodities that have been taken out.

\* \* \* \* \*